(12) United States Patent
Ogata et al.

(10) Patent No.: US 9,712,766 B2
(45) Date of Patent: Jul. 18, 2017

(54) SIGNAL PROCESSING DEVICE AND METHOD, IMAGING DEVICE AND SOLID STATE IMAGING ELEMENT

(71) Applicant: Sony Corporation, Tokyo (JP)

(72) Inventors: Satoshi Ogata, Fukuoka (JP); Rei Yoshikawa, Kangawa (JP); Hiroaki Ebihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 29 days.

(21) Appl. No.: 14/858,384

(22) Filed: Sep. 18, 2015

(65) Prior Publication Data

US 2016/0014355 A1 Jan. 14, 2016

Related U.S. Application Data

(63) Continuation of application No. 13/847,551, filed on Mar. 20, 2013, now Pat. No. 9,160,940.

(30) Foreign Application Priority Data

Apr. 27, 2012 (JP) ................................. 2012-103132

(51) Int. Cl.
H04N 5/335 (2011.01)
H04N 5/357 (2011.01)
(Continued)

(52) U.S. Cl.
CPC ............. H04N 5/357 (2013.01); H04N 5/335 (2013.01); H04N 5/378 (2013.01); H04N 5/3742 (2013.01); H04N 5/3765 (2013.01)

(58) Field of Classification Search
USPC ...................................................... 348/308
See application file for complete search history.

(56) References Cited

U.S. PATENT DOCUMENTS

2002/0024068 A1* 2/2002 Shinohara .............. H04N 3/155
257/225
2008/0157826 A1* 7/2008 Chen .................... G09G 3/3648
327/108
(Continued)

FOREIGN PATENT DOCUMENTS

CN 102244742 A 11/2011
JP 2007-522539 A 8/2007
(Continued)

OTHER PUBLICATIONS

Japanese Office Action issued Feb. 16, 2016 for corresponding Japanese Application No. 2012-103132.
(Continued)

Primary Examiner — Stephen Coleman
(74) Attorney, Agent, or Firm — Michael Best & Friedrich LLP

(57) ABSTRACT

A signal processing device includes a control unit that suspends supplying of a signal to an A/D conversion unit which performs A/D conversion, during an A/D conversion period in which the A/D conversion is performed on the signal that depends on an electric charge read from a pixel; and a maintenance unit that maintains a signal value of the signal in a state where the signal is supplied by the control unit to the A/D conversion unit and that supplies the maintained signal value to the A/D conversion unit in a state where the supplying of the signal to the A/D conversion unit is suspended by the control unit.

12 Claims, 12 Drawing Sheets

(51) Int. Cl.
H04N 5/378 (2011.01)
H04N 5/374 (2011.01)
H04N 5/376 (2011.01)

(56) References Cited

U.S. PATENT DOCUMENTS

| | | | | |
|---|---|---|---|---|
| 2009/0256939 | A1* | 10/2009 | Sonoda | H04N 5/378 348/302 |
| 2009/0290046 | A1* | 11/2009 | Kita | H04N 5/23222 348/231.99 |
| 2009/0295610 | A1 | 12/2009 | Yoshimoto | |
| 2010/0188542 | A1* | 7/2010 | Mizuguchi | H04N 9/045 348/302 |
| 2011/0279723 | A1 | 11/2011 | Takamiya et al. | |

FOREIGN PATENT DOCUMENTS

| | | |
|---|---|---|
| JP | 2008-067107 A | 3/2008 |
| JP | 2009-010787 A | 1/2009 |
| JP | 2009-278236 A | 11/2009 |
| JP | 2011-078049 A | 4/2011 |

OTHER PUBLICATIONS

Chinese Office Action issued Feb. 17, 2017 for corresponding Chinese Application No. 201310135198.X.

* cited by examiner

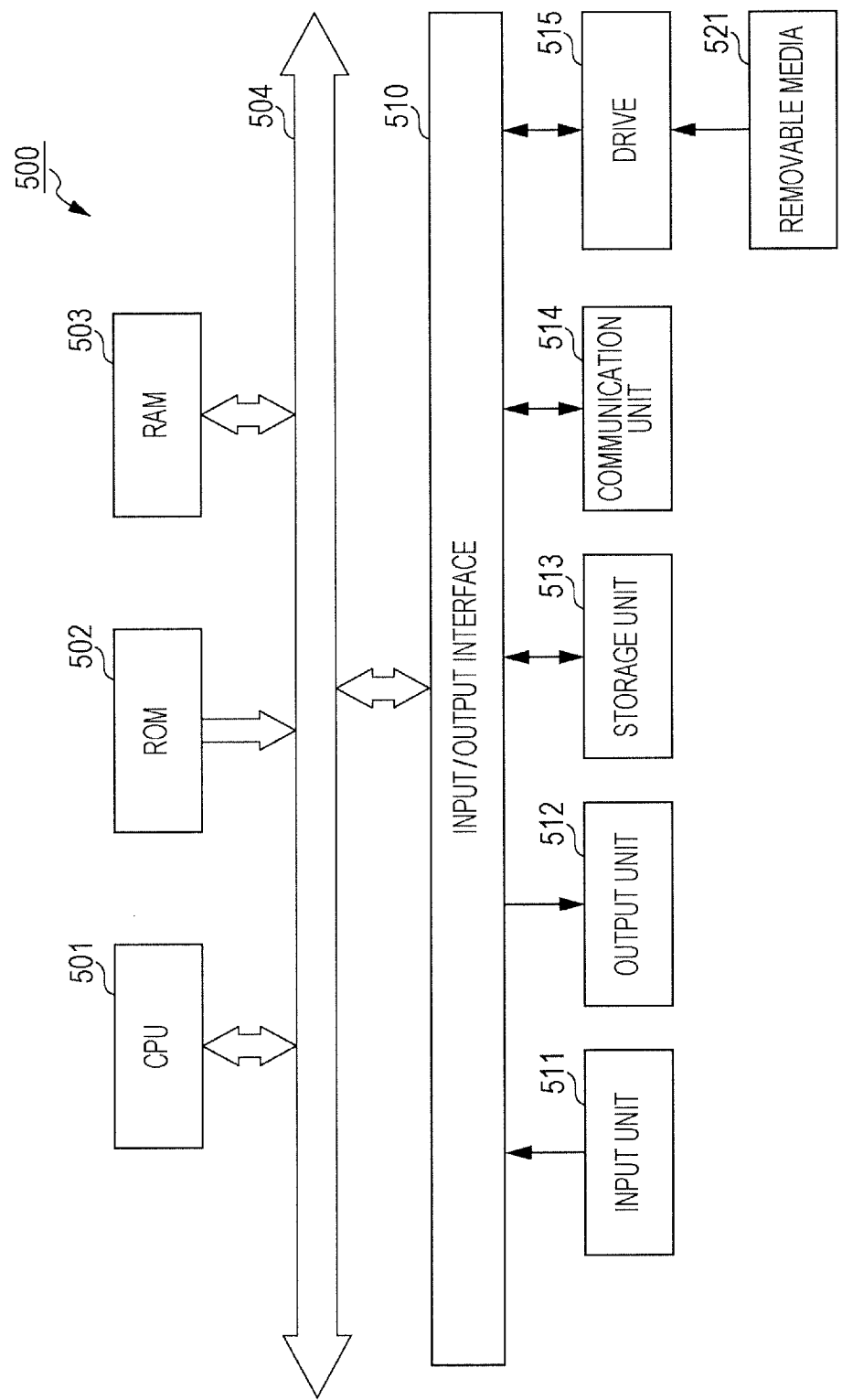

SIGNAL PROCESSING DEVICE AND METHOD, IMAGING DEVICE AND SOLID STATE IMAGING ELEMENT

CROSS REFERENCE TO RELATED APPLICATIONS

This is a Continuation application of U.S. application Ser. No. 13/847,551, filed Mar. 20, 2013, which claims priority to Japanese Patent Application No. 2012-103132, filed Apr. 27, 2012, the entire contents of which are incorporated herein by reference.

BACKGROUND

The present technology relates to a signal processing device and method, an imaging device, and a solid state imaging element, and particularly to a signal processing device and method, an imaging device, and a solid state imaging element that are able to suppress an occurrence of a spurious signal.

In a column ADC circuit in an imaging element in the related art, an A/D conversion is performed by a comparator circuit comparing a reference voltage with a vertical signal line (VSL) in contact to an output terminal of a source follower circuit that performs pixel signal reading.

Generally, the vertical signal line (VSL) is connected directly to the comparator circuit. For this reason, there is a concern that when an output fluctuation in the vertical signal line (VSL) occurs during an A/D conversion period, an error occurs in a signal that is originally intended to be read and a resultant spurious signal is A/D-converted.

So, the technique in which a disconnection switch is provided in the vertical signal line (VSL) is provided as a technique that suppresses the output fluctuation (for example, refer to Japanese Unexamined Patent Application Publication No. 2008-67107).

SUMMARY

However, there is a concern that, because switching is performed only once in a case of such a technique, a fluctuation in a sampling node due to charge injection and clock feedthrough at the time of the switching appears as a signal error.

It is desirable to suppress an occurrence of a spurious signal.

According to an embodiment of the present technology, there is provided a signal processing device including a control unit that suspends supplying of a signal to an A/D conversion unit which performs A/D conversion, during an A/D conversion period in which the A/D conversion is performed on the signal that depends on electric charge read from a pixel, and a maintenance unit that maintains a signal value of the signal in a state where the signal is supplied by the control unit to the A/D conversion unit and that supplies the maintained signal value to the A/D conversion unit in a state where the supplying of the signal to the A/D conversion unit is suspended by the control unit.

The A/D conversion unit may have two A/D conversion periods, a pre-charge period in which a noise of the pixel is A/D-converted, and a data period in which the signal including data on the pixel is A/D-converted, and may perform a correlated double sampling (CDS) operation of taking a difference between a result of the A/D conversion during the pre-charge period and a result of the A/D conversion during the data period.

The control unit may suspend the supplying of the signal to the A/D conversion unit during the data period of the A/D conversion period.

The control unit may suspend the supplying of the signal at least during the entire data period.

The control unit may suspend the supplying of the signal during a period that includes the entire data period and is longer than the data period.

The control unit may additionally suspend the supplying of the signal during the pre-charge period of the A/D conversion period.

The control unit may suspend the supplying of the signal during the entire pre-charge period.

The control unit may suspend the supplying of the signal during a period that includes the entire pre-charge period and is longer than the pre-charge period.

The control unit may include a switch that controls a connection between a signal line over which to transfer the signal, and an input to the A/D conversion unit, and a control signal supply unit that supplies a control signal controlling the switch, and the control signal supply unit may supply the control signal, disconnecting the signal line and the input to the A/D conversion unit, to the switch during the A/D conversion period.

The switch may be a complementary switch.

The maintenance unit may include a capacitor that is formed between an input to the A/D conversion unit and a reference electric charge, and maintains the signal value.

The signal processing device may further include an A/D conversion unit.

The A/D conversion unit may A/D-convert the signal that depends on the electric charge of the each pixel in a predetermined line in a pixel array.

The signal processing device may further include a source follower unit that generates and transfers the signal which depends on the electric charge read from the pixel, and the control unit may suspend the supplying of the signal, output from the source follower unit, to the A/D conversion unit during the A/D conversion period.

The signal processing device further include a photodiode that accumulates the electric charge in the pixel, and a floating diffusion unit that maintains the electric charge read from the photodiode, and the source follower unit may generate and transfer the signal that depends on the electric charge maintained in the floating diffusion unit.

According to another embodiment of the present technology, there is provided a signal processing method for use in a signal processing device including: causing the signal processing unit to suspend supplying of a signal to an A/D conversion unit which performs A/D conversion, during an A/D conversion period in which the A/D conversion is performed on the signal that depends on an electric charge read from a pixel; and causing the signal processing unit to maintain a signal value of the signal in a state where the signal is supplied to the A/D conversion unit and to supply the maintained signal value to the A/D conversion unit in a state where the supplying of the signal to the A/D conversion unit is suspended.

According to a still another embodiment of the present technology, there is provided an imaging device including an imaging unit that images a photographic object, and an image processing unit that image-processes image data obtained through the imaging by the imaging unit, in which the imaging unit includes an A/D conversion unit that A/D-converts a signal depending on an electric charge read from a pixel and generates the image data, and a control unit that suspends supplying of the signal to the A/D conversion unit during an A/D conversion period in which A/D conversion is performed on the signal.

The A/D conversion unit may have two A/D conversion periods, a pre-charge period in which a noise of the pixel is A/D-converted, and a data period in which the signal including data on the pixel is A/D-converted, and may perform a correlated double sampling (CDS) operation of taking a difference between a result of the A/D conversion during the pre-charge period and a result of the A/D conversion during the data period.

According to still another embodiment of the present technology, there is provided a solid state imaging element including a control unit that suspends supplying of a signal to an A/D conversion unit which performs A/D conversion, during an A/D conversion period in which the A/D conversion is performed on the signal that depends on an electric charge read from a pixel, and a maintenance unit that maintains a signal value of the signal in a state where the signal is supplied by the control unit to the A/D conversion unit and that supplies the maintained signal value to the A/D conversion unit in a state where the supplying of the signal to the A/D conversion unit is suspended by the control unit.

The A/D conversion unit may have two A/D conversion periods, a pre-charge period in which a noise of the pixel is A/D-converted, and a data period in which the signal including data on the pixel is A/D-converted, and may perform a correlated double sampling (CDS) operation of taking a difference between a result of the A/D conversion during the pre-charge period and a result of the A/D conversion during the data period.

According to an embodiment of the present technology, supplying of a signal to an A/D conversion unit that performs A/D conversion is suspended during an A/D conversion period in which the A/D conversion is performed on the signal that depends on an electric charge read from the pixel, a signal value of the signal is maintained in a state where the signal is supplied to the A/D conversion unit, and the maintained signal value is supplied to the A/D conversion unit in a state where the supplying of the signal to the A/D conversion unit is suspended.

According to another embodiment of the present technology, a signal value of a signal that depends on an electric charge read from a pixel in an imaging unit imaging a photographic object is maintained, supplying of the signal is suspended during an A/D conversion period, the maintained signal value is A/D-converted, and the generated image data is image-processed.

According to the present technology, information can be processed. Particularly, an occurrence of a spurious signal can be suppressed.

BRIEF DESCRIPTION OF THE DRAWINGS

FIG. 12 is a block diagram illustrating an example of a main configuration of a computer.

DETAILED DESCRIPTION OF EMBODIMENTS

Embodiments according to the present technology (hereinafter, referred to as embodiments) are described below. Moreover, descriptions are provided in the following sequence.
1. First Embodiment (Imaging Device)
2. Second Embodiment (Imaging Device)
3. Third Embodiment (Computer)
1. First Embodiment
1-1. Occurrence of Spurious Signal A column analog digital converter (ADC) circuit in an imaging element in the related art, an analog/digital (A/D) conversion is performed by a comparator circuit comparing a reference voltage with a vertical signal line (VSL) in contact to an output terminal of a source follower (SF) circuit that performs pixel signal reading.

Figure 1:
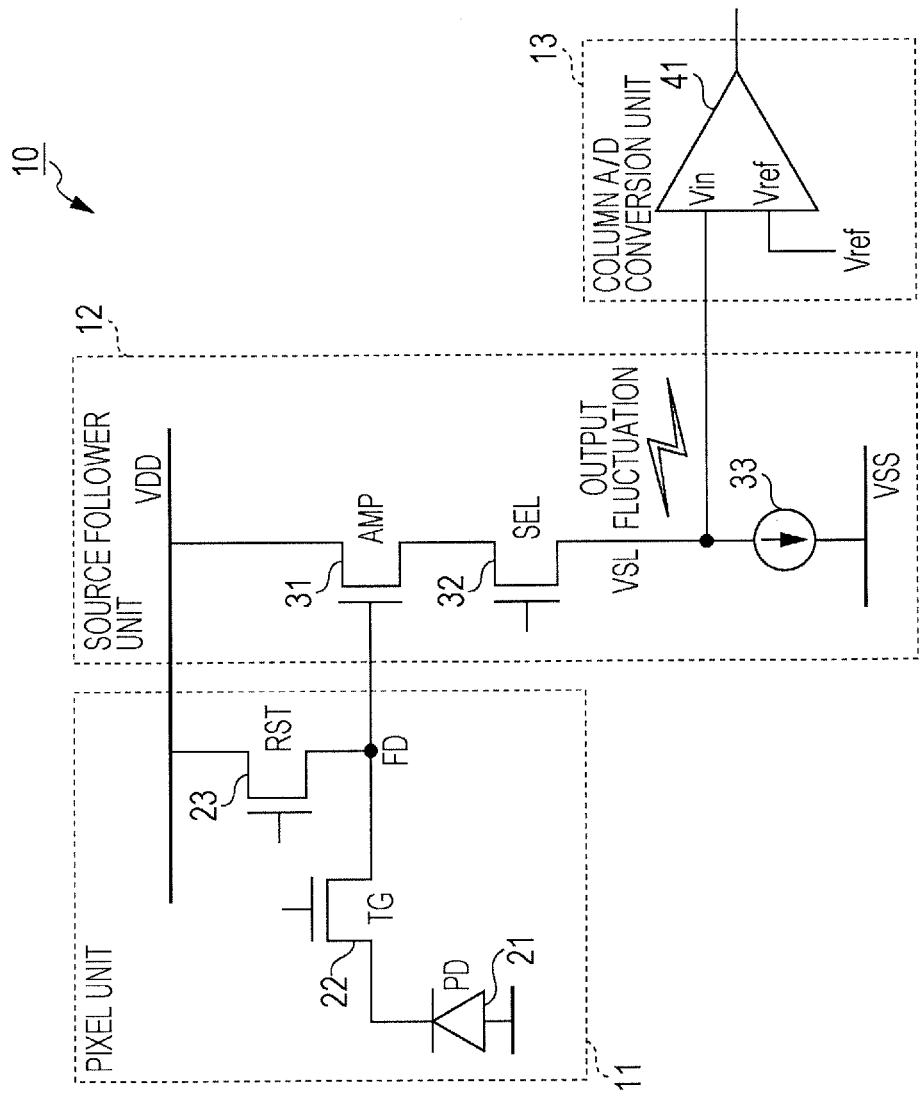
FIG. 1 is a view illustrating an example of a main configuration of one part of an imaging device.

FIG. 1 is a view illustrating an example of a main configuration of one part of an imaging device. An imaging device 10 illustrated in FIG. 1 images a photographic object, photoelectric-converts light from the photographic object, A/D-converts an electric charge of each pixel, and outputs the result as digital data.

As illustrated in FIG. 1, the imaging device 10 has a pixel unit 11, a source follower unit 12, and a column A/D conversion unit 13.

The pixel unit 11 shows a configuration for one pixel that photoelectric-converts the light from the photographic object. The pixel unit 11 has a photo diode (PD) 21, a transfer gate (TG) 22, and a reset transistor (RST) 23.

The photo diode (PD) 21 photoelectric-converts the light from the photographic object and accumulates the electric charge. The transfer gate (TG) 22 is provided between the photo diode (PD) and a floating diffusion (FD), and controls reading of the electric charge accumulated in the photo diode (PD) 21. The reset transistor (RST) 23 is provided between a reference electric potential VDD and the floating diffusion (FD), and controls initialization of the floating diffusion (FD).

The source follower unit 12 reads the electric charge from the pixel unit 11, and supplies the read electric charge to the column A/D conversion unit 13. The source follower unit 12 has an amplification transistor (AMP) 31, a selection transistor (SEL) 32, and an electric current source 33.

The amplification transistor (AMP) 31 amplifies an electric potential fluctuation (a pixel output fluctuation) due to electric charge accumulation in the floating diffusion (FD), and transfers the amplified pixel output fluctuation to the selection transistor (SEL) 32.

The selection transistor (SEL) 32 controls transfer of the pixel output fluctuation to a vertical signal line (VSL). The electric current source 33 is a load to the vertical signal line (VSL) for reading the pixel output fluctuation.

The column A/D conversion unit 13 A/D-converts the pixel output fluctuation that is transferred through the vertical signal line (VSL), and outputs the result as digital data (image data). The column A/D conversion unit 13 has a comparator 41.

The comparator 41 compares a reference electric potential Vref with the pixel output fluctuation transferred through the vertical signal line (VSL), and outputs the result of the comparison (two items of value data).

However, in a case of this configuration, the vertical signal line (VSL) is for direct input to the comparator 41. For this reason, there is a concern that when the output fluctuation in the vertical signal line (VSL) occurs during an A/D conversion period in which the A/D conversion is performed by the A/D conversion unit 13, an error occurs in a signal that is originally intended to be read and a resultant spurious signal is A/D-converted as in the example illustrated in FIG. 2.

Figure 2:
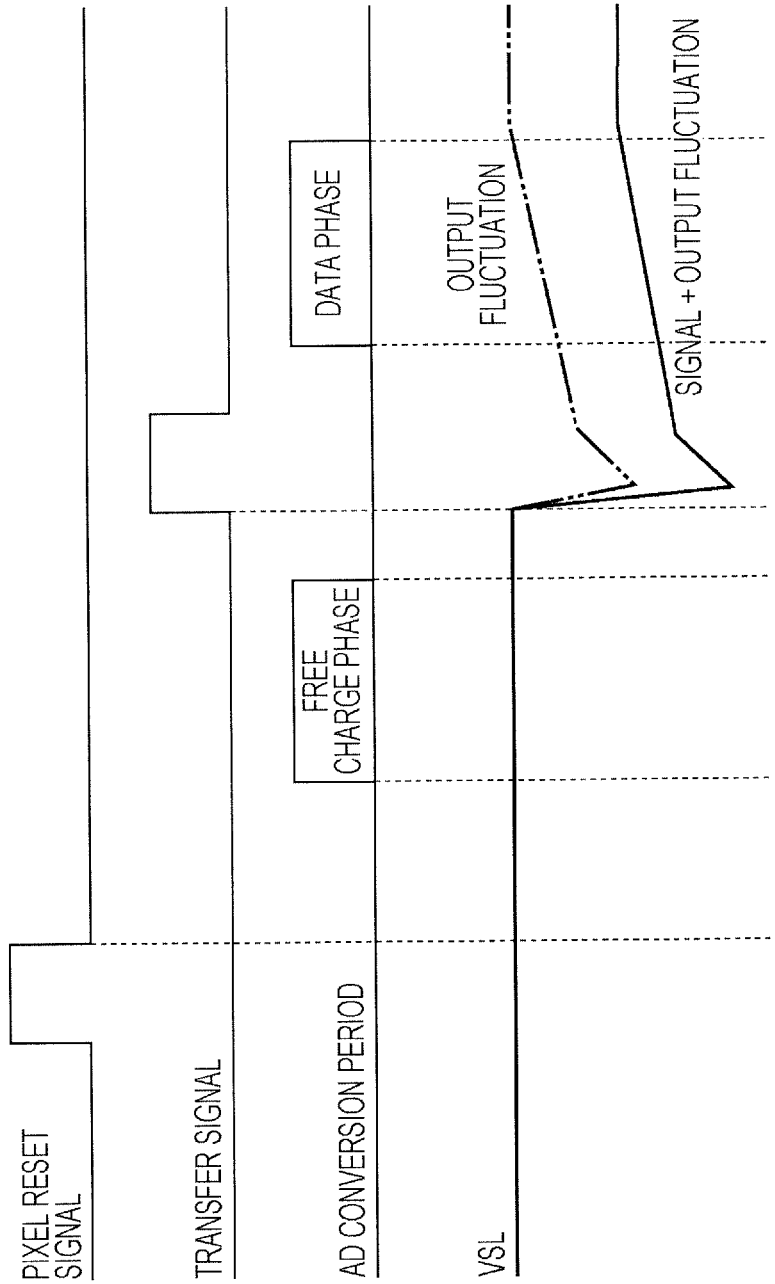
FIG. 2 is a timing chart illustrating an example of signals in the imaging device.

FIG. 2 is a timing chart illustrating an example of signals in the imaging device. In a case of the example in FIG. 2, after the opening of the transfer gate (TG) 22 by a transfer signal pulse causes the floating diffusion (FD) to read the electric charge accumulated in the photo diode (PD) 21, the electric charge of the vertical signal line (VSL) fluctuates due to a different factor from the factor for the pixel output fluctuation (the pixel signal), as illustrated by a two dot chain line in FIG. 2.

For this reason, there is a concern that also during a data phase of the A/D conversion period, the electric potential of the vertical signal line (VSL) fluctuates and an error (a spurious signal) is included in the result of the A/D conversion.

For example, a blooming from a common pixel is considered as a factor for causing the pixel output fluctuation to occur.

Figure 3:
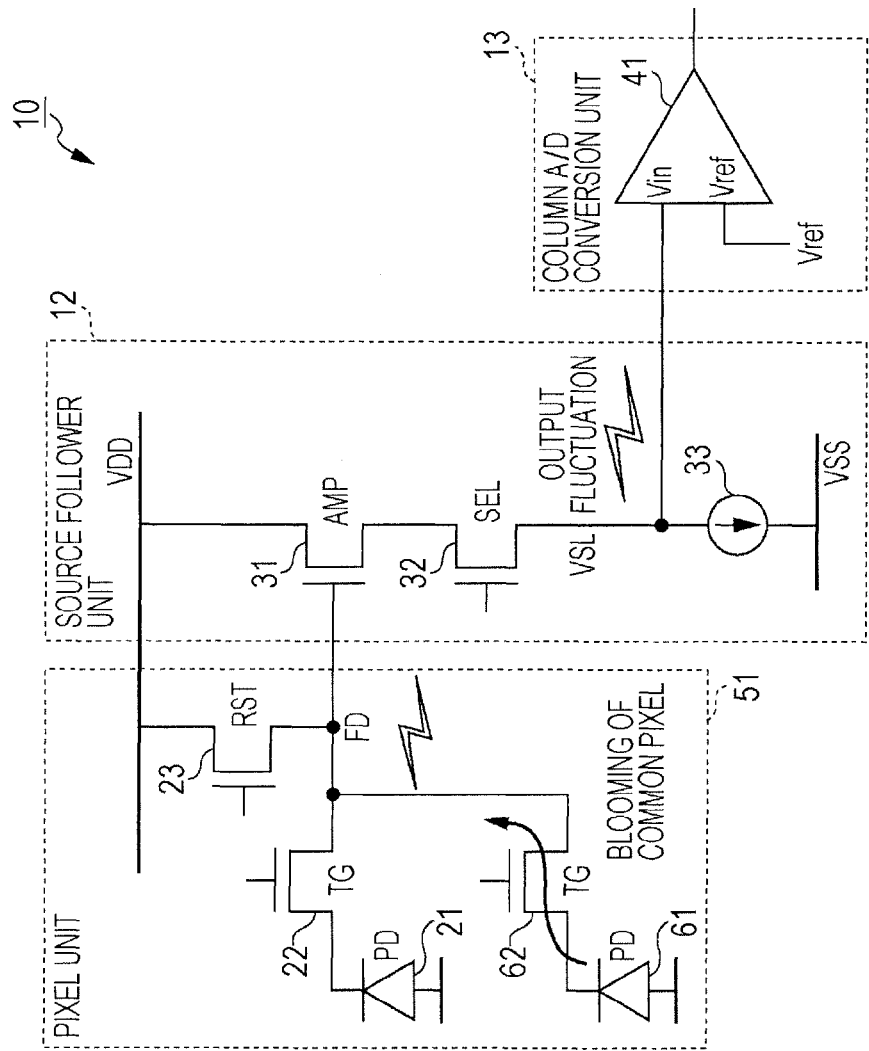
FIG. 3 is a view illustrating an example of a main configuration of one part of the imaging device.

FIG. 3 is a view illustrating an example of a main configuration of one part of the imaging device. In a case of the example in FIG. 3, instead of the pixel unit 11, the imaging device 10 has a pixel unit 51.

In the pixel unit 51, the multiple photo diodes (PD) and the multiple transfer gates (TG) share one floating diffusion (FD). In the case of the example in FIG. 3, in addition to the photo diode (PD) 21 and the transfer gate (TG) 22, the pixel unit 51 has a photo diode (PD) 61 and a transfer gate (TG) 62 that share one floating diffusion (FD) and one reset transistor (RST) 23. Therefore, as illustrated in FIG. 3, the photo diode (PD) 21 and the transfer gate (TG) 22, and the photo diode (PD) 61 and the transfer gate (TG) 62 share the amplification transistor (AMP) 31 of the source follower unit 12, the selection transistor (SEL) 32 and the electric current source 33.

This common pixel method is used as a technology for increasing the number of saturated electrons and making the pixel smaller. When the reset transistor (RST) 23 is closed after performing a reset operation of opening the reset transistor (RST) 23 and sweeping off electrons from the floating diffusion (FD), the transfer gate (TG) of the target photo diode (PD) is opened and thus the signal (the electric charge) is transferred to the floating diffusion (FD).

Figure 4:
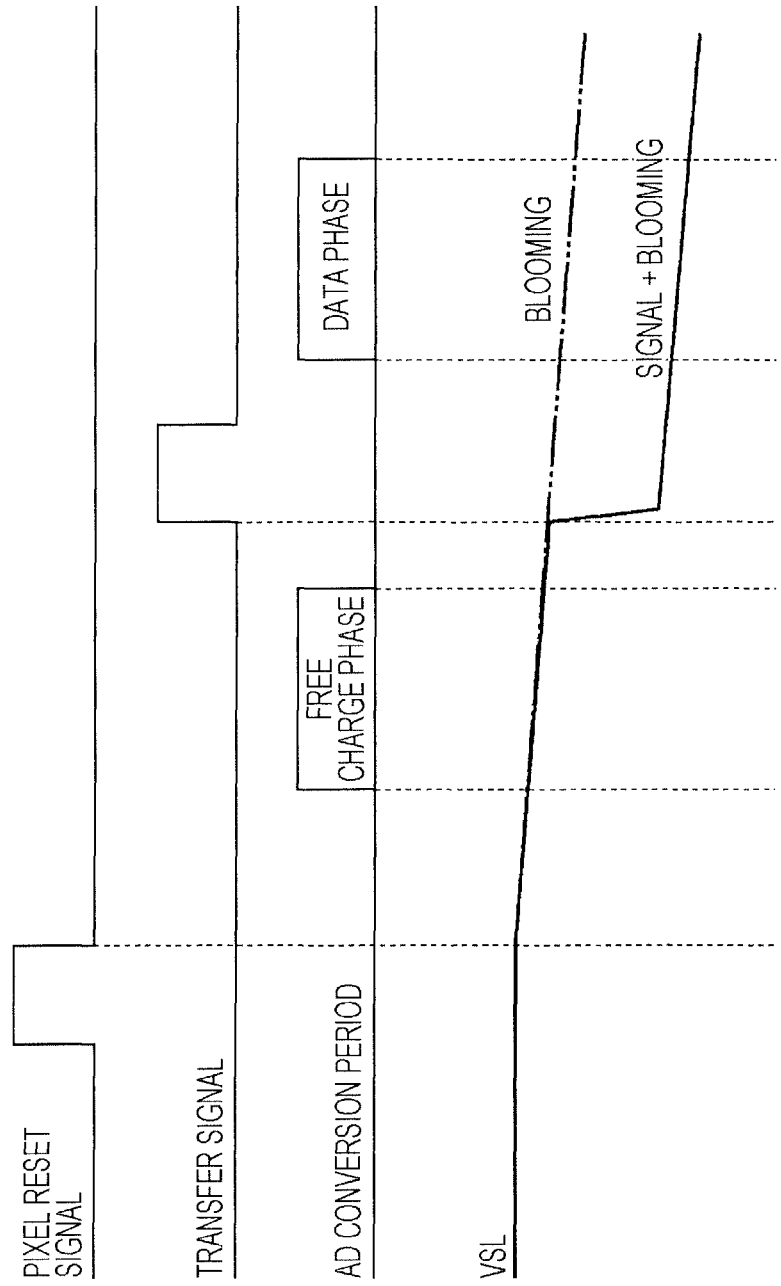
FIG. 4 is a timing chart illustrating an example of the signals in the imaging device.

At that time, the signal is not able to be read because the transfer gate (TG) of the non-target photo diode (PD) is closed. However, there is a concern that when a large amount of light that exceeds the number of saturated electrons is input, the blooming occurs in which the electrons overflowing from the photo diode (PD) leak into the floating diffusion (FD) through the transfer gate (TG). Because of this, a change occurs in the signal of the target photo diode (PD) that is originally intended to be read. Being temporarily influenced by the fluctuation until the floating diffusion (FD) is saturated, the electric potential of the floating diffusion (FD) usually fluctuates also during the A/D conversion period, and this fluctuation, as it is, appears as the output fluctuation also in the vertical signal line (VSL) (FIG. 4).

Furthermore, for example, the fluctuation in a power source that goes around from a pixel control line is considered as a factor for generating the pixel output fluctuation.

Figure 5:
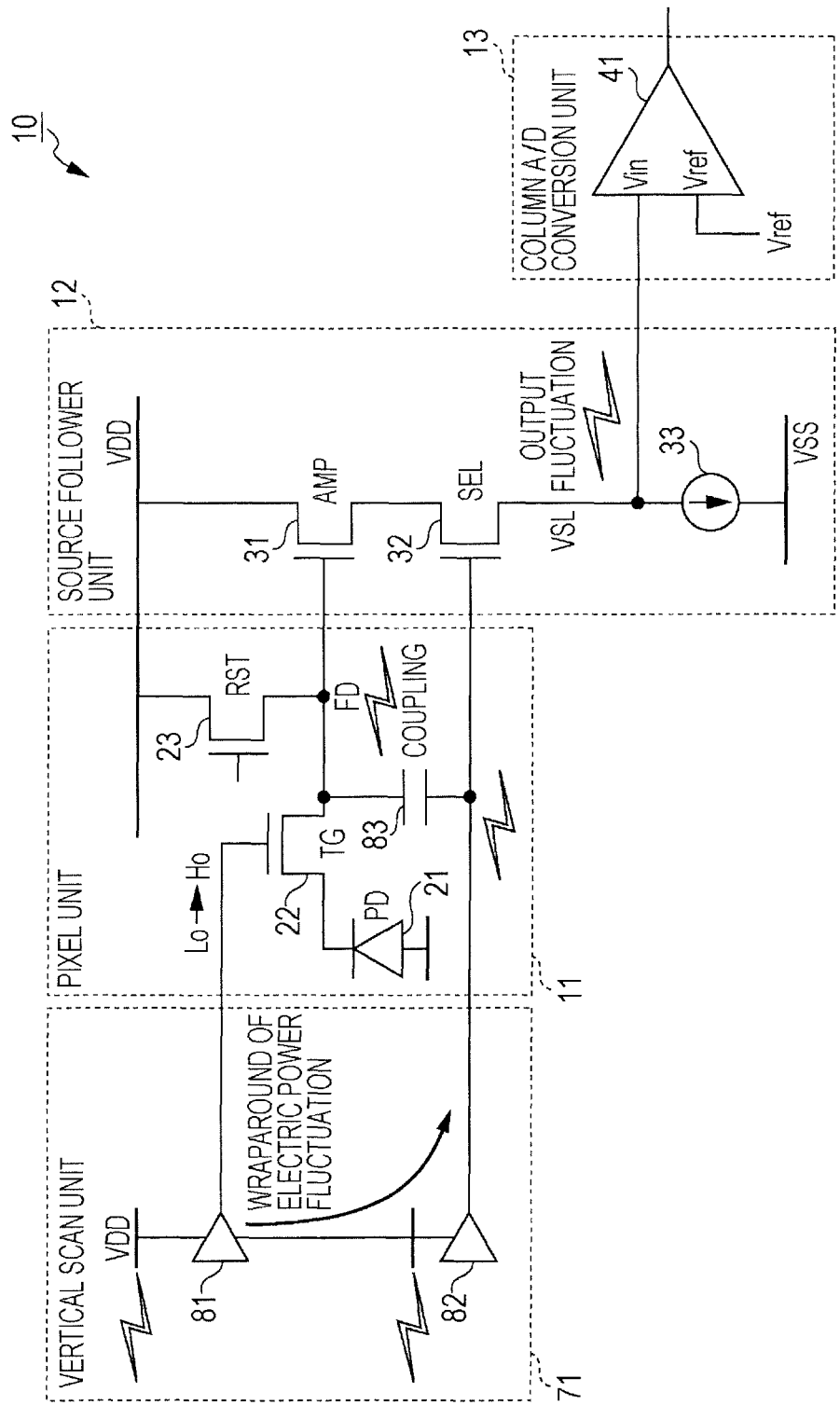
FIG. 5 is a view illustrating an example of a main configuration of one part of the imaging device.

FIG. 5 is a view illustrating an example of a main configuration of one part of the imaging device. In the example in FIG. 5, the imaging device 10 has a vertical scan unit 71 that drives the pixel unit 11 and the source follower unit 12.

In the vertical scan unit 71 that performs the reset operation, a transfer operation and a selection operation in the pixel control, a driver (a driver 81 and a driver 82) for driving the reset transistor (RST) 23, the transfer gate (TG) 22, and the selection transistor (SEL) 32 at the time of each operation is provided, and outputs from the drivers are supplied as a control signal into the pixel. When the power source for the drivers is common and the transfer gate (TG) 22 is opened, for example, with a signal transfer and a global shutter, the electric charge is pulled out to the side of the power source to change the electric potential of a control line of the closed transfer gate (TG) 22 from a LOW level to a HIGH level.

Figure 6:
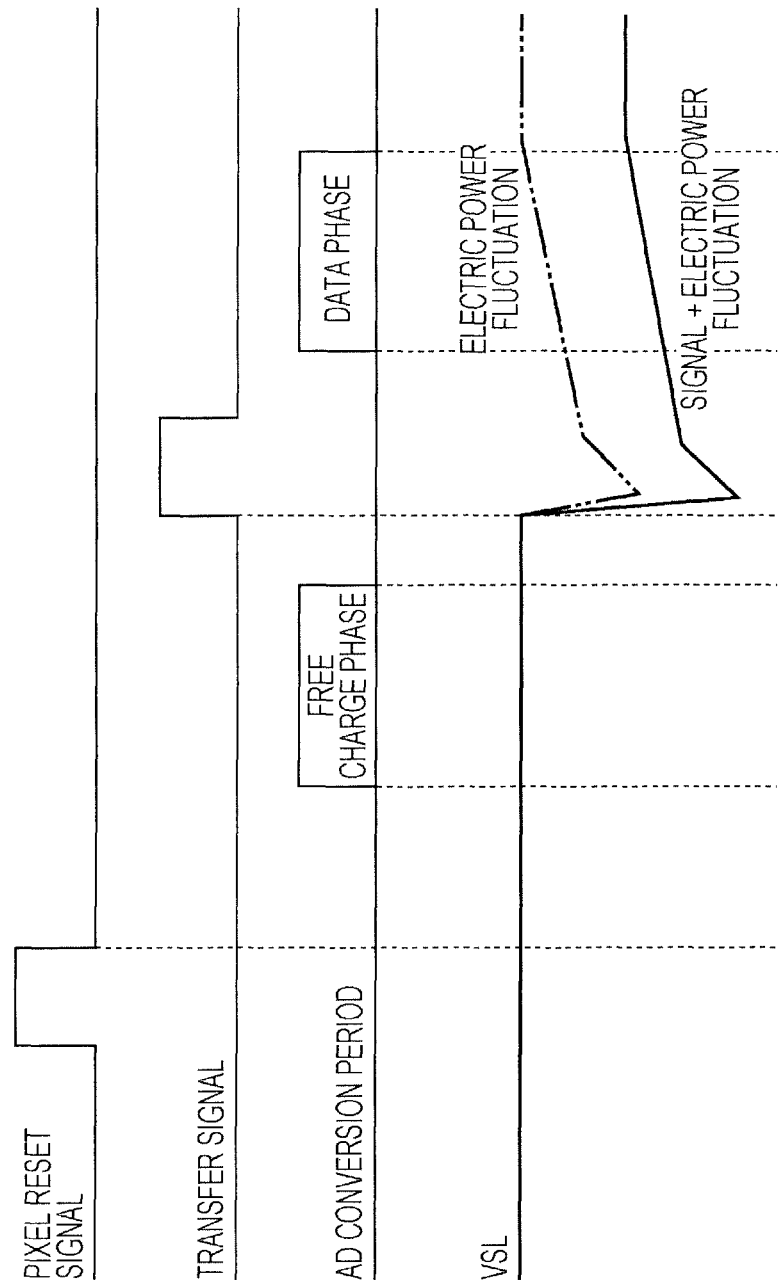
FIG. 6 is a timing chart illustrating an example of the signals in the imaging device.

Thus, the fluctuation occurs in the power source, but the fluctuation goes around through the driver because the power source is common. For example, because a HIGH level is usually supplied over the control line of the selection transistor (SEL) 32, when selecting the pixel on which to perform reading, the fluctuation in the power source, as it is, goes around, and the fluctuation in the power source goes around also in the floating diffusion (FD) through a coupling 83. The fluctuation in the floating diffusion (FD), as it is, appears as the output fluctuation in the vertical signal line (VSL) (FIG. 6).

As described above, there is a concern that when the fluctuation in the power source is not stabilized also during the A/D conversion period, the resultant spurious signal is A/D-converted.

The technique in which a disconnection switch is provided in the vertical signal line (VSL) is proposed, as a technique that suppresses this output fluctuation, in Japanese Unexamined Patent Application Publication No. 2008-67107. However, there is a concern that because switching is performed only once in a case of such a technique, a fluctuation in a sampling node due to charge injection and clock feedthrough at the time of the switching appears as a signal error.

1-2. Suppression of Occurrence of Spurious Signal

Then, control may be performed on supplying of a signal that depends on the electric charge read from the pixel to an A/D conversion unit that performs A/D conversion on the electric charge read from the pixel. Then, furthermore, during the A/D conversion period in which the signal is to be A/D-converted, the supplying of the signal to the A/D conversion unit is suspended, and a signal value of the signal, which is maintained in a state where the signal is supplied to the A/D conversion unit, is supplied to the A/D conversion unit.

By doing this, the fluctuation in the signal value during the A/D conversion period for an input to the A/D conversion unit may be suppressed, and the occurrence of the spurious signal due to the fluctuation in the signal value may be suppressed. Thus, image quality of the image that corresponds to the image data may be improved.

Furthermore, the A/D conversion unit may perform the A/D conversions both during a pre-charge period (also referred to as a pre-charge phase) in which a noise of the pixel is to be A/D-converted and during a data period (also referred to as a data phase) in which a signal containing pixel data is to be A/D-converted, and may perform a correlated double sampling (CDS) operation that takes a difference between results of both of the A/D conversions. Thus, a noise component such as a kTC noise may be suppressed. Thus, the image quality of the image that corresponds to the image data may be improved.

Moreover, during the data phase of the A/D conversion period, the supplying of the signal to the A/D conversion unit may be suspended. By doing this, the occurrence of the spurious signal may be suppressed during the data phase.

Moreover, the supplying of the signal to the A/D conversion unit may be suspended during one part of the A/D conversion period (of the data phase). If the occurrence of the spurious signal is suppressed to some degree, the image quality of the image that corresponds to the image data may be improved that much.

However, the influence of the fluctuation in the signal value depends also on the A/D conversion technique, but most of the time the influence is greater at an earlier point in time (at the timing that is nearer a starting point in time) of the A/D conversion period. For example, in a case of an integral type, the fluctuation in the signal value at the beginning of the A/D conversion period also has an influence on the result of the A/D conversion that is to be taken when an original signal value is small. Because when the original signal value is great, a fluctuation component is relatively small with respect to the original signal value, it is likely that the influence on the image quality will be small. However, when the original signal value is small, the fluctuation component tends to be relatively large. For this reason, there is a concern that at the beginning of the A/D conversion period in which the A/D conversion is performed also in a case where the signal value is small, the fluctuation in the signal value has a great influence on the image quality.

Furthermore, there is a concern that in a case where the fluctuation in the signal value is not brief, but continuous, when the fluctuation occurs from an earlier point in time of the A/D conversion period, a period of the fluctuation becomes longer and an amount of the fluctuation also becomes greater. That is, in the case of the integral type, there is a concern that the time becomes longer for the influence of the fluctuation in the signal value to be exerted. Furthermore, there is a concern that the variation component becomes greater. For this reason, there is a concern that even though the original signal value is great, the fluctuation in the signal value from the beginning of the A/D conversion period has a great influence on the image quality.

For this reason, at an earlier point in time (at the timing that is nearer the starting point in time) of the A/D conversion period (of the data phase), the fluctuation in the signal value is preferably suppressed. That is, at an earlier point in time (at the timing that is nearer the starting point in time) of the A/D conversion period (of the data phase), the supplying of the signal to the A/D conversion unit may be suspended. For example, the supplying of the signal to the A/D conversion unit may be suspended from a starting point in time of the A/D conversion period (of the data phase). Furthermore, for example, the supplying of the signal to the A/D conversion unit may be suspended from the point in time that is earlier than the starting point in time of the A/D conversion period (of the data phase). By doing this, an effect of suppressing the occurrence of the spurious signal during the A/D conversion period (the data phase of the A/D conversion period) may be more increased.

Moreover, of course, during the entire A/D conversion period (the entire data phase of the A/D conversion period), the supplying of the signal to the A/D conversion unit may be suspended. For example, during a period that includes the entire period of the A/D conversion period (the entire data phase of the A/D conversion period) and is longer than the period of the A/D conversion period (the data phase of the A/D conversion period), the supplying of the signal may be suspended.

For example, the supplying of the signal to the A/D conversion unit may be suspended from the starting point in time of the A/D conversion period (of the data phase) to an ending point in time. Furthermore, for example, the supplying of the signal to the A/D conversion unit may be suspended from the starting point in time of the A/D conversion period (of the data phase) to a point in time than is later than the ending point in time.

Moreover, for example, the supplying of the signal to the A/D conversion unit may be suspended from a point in time that is earlier than the starting point in time of the A/D conversion period (of the data phase) to the ending point in time. Furthermore, for example, the supplying of the signal to the A/D conversion unit may be suspended from the point in time that is earlier than the starting point in time of the A/D conversion period (of the data phase) to a point in time than is later than an ending point in time.

By doing this, the occurrence of the spurious signal during the entire A/D conversion period (the entire data phase of the A/D conversion period) may be suppressed. Thus, the image quality of the image that corresponds to the image data may be more improved.

Moreover, the supplying of the signal to the A/D conversion unit may be suspended also during the pre-charge phase of the A/D conversion period described above. As described above, there is a concern that in a case where a CDS operation is performed in the A/D conversion, of course, the signal fluctuation during the pre-charge phase also has an influence on the result of the A/D conversion. For this reason, also during the pre-charge phase, the occurrence of the spurious signal may be suppressed and the image quality of the image that corresponds to the image data may be improved by suspending the supplying of the signal of the A/D conversion unit in the same manner as during the data phase.

Of course, also during the pre-charge phase, the supplying of the signal to the A/D conversion unit may be suspended during one part of the period, and the supplying of the signal to the A/D conversion unit may be suspended during the entire period, in the same manner as during the data phase. Because a specific example is the same as during the data phase described above, a description thereof is omitted.

As described above, in order to control the supplying of the signal to the A/D conversion unit, a switch may be provided that controls a connection between a signal line to which the signal is transferred and an input to the A/D conversion unit, and further a control signal supply unit may be provided that supplies the control signal controlling the switch.

The control signal supply unit supplies the control signal, which disconnects the signal line and the input to the A/D conversion unit, to the switch, during the A/D conversion period. The switch is driven according to the control signal, and disconnects the signal line and the input to the A/D conversion unit. With this configuration, the control of the supplying of the signal to the A/D conversion unit may be more easily realized.

Moreover, the switch may be made from a complementary switch that connects in parallel an N-type transistor and a P-type transistor and that drives both the transistors at the same time by applying gate control voltages, which are different in polarity, to gates of the transistors, at the same time, respectively. The use of the complementary switch may transfer the entire electric potentials from the input side to the output side more surely than a switch made from the single transistor.

Furthermore, maintenance of the signal value, which is performed in a state where the signal is supplied to the A/D conversion unit, may be realized by a capacitor. For example, a capacitor may be formed between the input to the A/D conversion unit and the reference electric potential, and the signal value of the signal supplied by the capacitor may be maintained. Moreover, the capacitor is provided between the switch and the input to the A/D conversion unit that are described above. With this configuration, the capacitor may maintain the signal value of the signal in a state where the signal is supplied to the A/D conversion unit, and may supply the signal value, which is maintained, to the A/D conversion unit, in a state where the supplying of the signal to the A/D conversion unit is suspended. Therefore, during the A/D conversion period, the fluctuation in the signal value may be suppressed and the occurrence of the spurious signal may be suppressed.

Moreover, the A/D conversion unit described above may be configured from other devices, and may be configured from one device, along with the switch and the capacitor described above. That is, the present technology may be realized as a signal processing device that processes an input signal of an A/D-convertor, and may be realized as the A/D-convertor that performs the processing described above on the signal that is input. Of course, the present technology may be realized also as a device other than these.

Furthermore, the pixels that accumulate the electric charge that results from photoelectric-converting incident light may be arranged, for example, in the form of a matrix. The signal line over which to transfer the signal described above may be a vertical signal line over which to transfer the signal that depends on the electric charge of each pixel in a predetermined line in a pixel array. The A/D conversion unit described above may be the column A/D conversion unit that A/D-converts the signal that is output from the vertical signal line. That is, the present technology may be applied also to the column A/D conversion unit that is used, for example, in an imaging element such as a complementary metal oxide semiconductor (CMOS) image sensor.

Moreover, a source follower unit may further be provided that generates and transfers the signal that depends on the electric charge read from the pixel. Moreover, in the pixel, the photodiode that accumulates the electric charge taken by photoelectric-converting the incident light, and the floating diffusion unit that maintains the electric charge read from the photodiode may be provided.

That is, the present technology may be realized not only as the signal processing device, but also as the imaging element (including a solid state imaging element). Moreover, the image processing device that processes the image data output from the imaging element may be provided and determined as an imaging device and the like. Furthermore, one part of or all of the control processing described above may be realized by software.

A description is provided in more detail below.

1-3. Signal Processing Device

Figure 7:
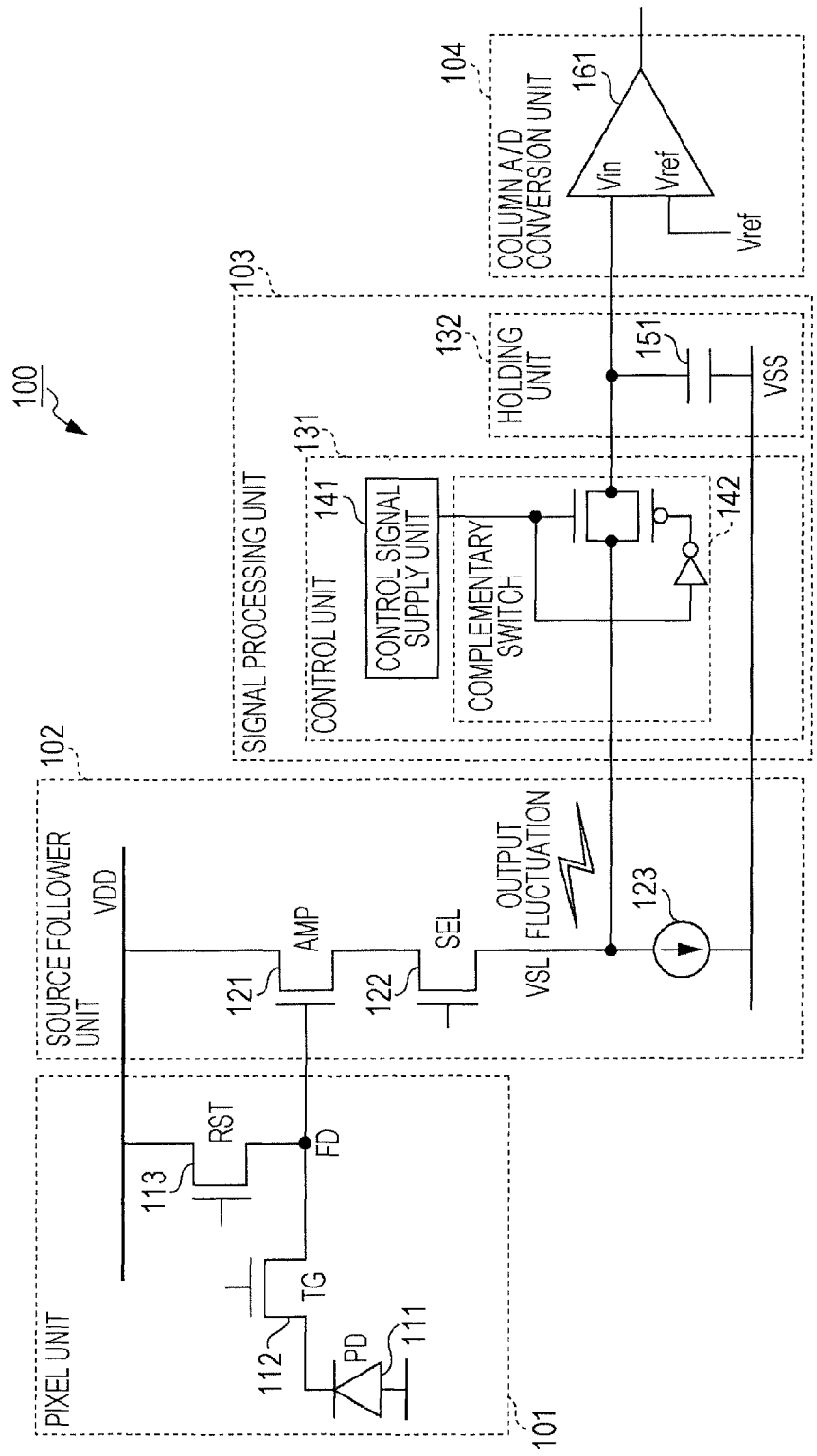
FIG. 7 is a view illustrating an example of a main configuration of one part of the imaging device to which the present technology is applied.

FIG. 7 is a view illustrating an example of a main configuration of one part of the imaging device to which the present technology is applied. An imaging device 100 illustrated in FIG. 7 images a photographic object, photoelectric-converts light from the photographic object, A/D-converts the electric charge of each pixel, and outputs the result as digital data.

As illustrated in FIG. 7, the imaging device 100 has a pixel unit 101, a source follower unit 102, a signal processing unit 103, and a column A/D conversion unit 104.

The pixel unit 101 shows a configuration for one pixel that photoelectric-converts the light from the photographic object. The imaging device 100 may actually have multiple pixel units 101. For example, the imaging device 100 may have multiple units 101 that are arranged in the form of a matrix (an array). Also in such a case, because the pixel units are the same in configuration, only the configuration for one pixel is illustrated in FIG. 7. The configuration of the pixel unit 101 is arbitrary. For example, the pixel unit 101 may have a photo diode (PD) 111, a transfer gate (TG) 112, and a reset transistor (RST) 113, as illustrated in FIG. 7.

The photo diode (PD) 111 photoelectric-converts the light from the photographic object and accumulates the electric charge. Moreover, the photo diode (PD) 111 is one example of a photoelectric transducer. The photoelectric transducer other than the photo diode (PD) 111 may be used instead of the photo diode (PD) 111.

The transfer gate (TG) 112 is provided between the photo diode (PD) and a floating diffusion (FD), and controls reading of the electric charge accumulated in the photo diode (PD) 111. The reset transistor (RST) 113 is provided between a reference electric potential VDD and the floating diffusion (FD), and controls initialization of the floating diffusion (FD).

The source follower unit 102 generates the signal (the pixel signal) that depends on the electric charge accumulated in the pixel unit 101, and supplies the generated pixel signal to the signal processing unit 103. The configuration of the source follower 102 is arbitrary. For example, the source follower unit 102 may have an amplification transistor (AMP) 121, a selection transistor (SEL) 122, and an electric current source 123, as illustrated in FIG. 7.

The amplification transistor (AMP) 121 is provided between the reference electric potential VDD and the selection transistor (SEL) 122, and a gate is connected to the floating diffusion (FD). The amplification transistor (AMP) 121 amplifies an electric potential fluctuation due to electric charge accumulation in the floating diffusion (FD), and transfers the amplified electric potential fluctuation, as the pixel signal, to the selection transistor (SEL) 122. That is, the amplification transistor (AMP) 121 reads the fluctuation (the pixel output fluctuation) in the floating diffusion (FD), as the pixel signal, and supplies the pixel signal to the selection transistor (SEL) 122.

The selection transistor (SEL) 122 is provided between the amplification transistor (AMP) 121 and the vertical signal line (VSL). The selection transistor (SEL) 122 controls whether or not the pixel signal supplied from the amplification transistor (AMP) 121 is supplied to the vertical signal line (VSL).

The electric current source 123 is a load to the vertical signal line (VSL) for the reading of the pixel signal (that is, the pixel output fluctuation).

The pixel signal supplied through the selection transistor (SEL) 122 is supplied to the signal processing unit 103 over the vertical signal line (VSL).

Moreover, in a case where the pixel unit 101 is arranged in the form of an array, the pixels that are present together in the same line may be connected to the same source follower unit 102. In this case, the source follower unit 102 has the amplification transistor (AMP) 121 and the selection transistor (SEL) 122 for every pixel that is connected. Furthermore, the vertical signal line (VSL) and the electric current source 123 are shared by the pixel for one line.

That is, the source follower unit 102, the signal processing unit 103 and the column A/D conversion unit 104 may be provided for every pixel line in the array of pixels.

The signal processing unit 103 is the signal processing unit to which the present technology is applied, and controls the supplying of the pixel signal transferred through the vertical signal line (VSL) of the source follower unit 102 to the column A/D conversion unit 104. Then, furthermore, the signal processing unit 103 suspends the supplying of the signal to the column A/D conversion unit 104 during the A/D conversion period in which the pixel signal is to be A/D-converted, and supplies the signal value of the pixel signal, which is maintained in a state where the signal is supplied to the column A/D conversion unit 104, to the A/D conversion unit 104.

By doing this, the signal processing unit 103 may suppress the fluctuation in the signal value during the period of the A/D conversion period for the input to the column A/D conversion unit 104 and may suppress the occurrence of the spurious signal due to the fluctuation in the signal value. Thus, the signal processing unit 103 may improve the image quality of the image that corresponds to the image data.

Moreover, the signal processing unit 103 may be configured from the signal processing device. Furthermore, the configuration of the signal processing unit 103 is arbitrary. For example, the signal processing unit 103, as illustrated in FIG. 7, may have a control unit 131 and a maintenance unit 132.

The control unit 131 may be provided between the vertical signal line (VSL) of the source follower unit 102 and the maintenance unit 132 (the column A/D conversion unit 104). The control unit 131 controls whether or not the pixel signal transferred through the vertical signal line (VSL) of the source follower unit 102 is supplied to the column A/D conversion unit 104.

The maintenance unit 132 may be provided between the control unit 131 and the column A/D conversion unit 104. The maintenance unit 132 maintains the signal value of the pixel signal while the vertical signal line (VSL) and the input to the column A/D conversion unit 104 are connected to each other, that is, while the pixel signal from the control unit 131 is supplied. Furthermore, in a case where the vertical signal line (VSL) and the input to the column A/D conversion unit 104 are disconnected (separated) by the control unit 131, that is, in a case where the pixel signal is not supplied from the control unit 131, the maintenance unit 132 supplies the signal value, which is maintained, to the column A/D conversion unit 104.

With this configuration, the maintenance unit 132 may maintain the signal value of the signal in a state where the control by the control unit 131 causes the pixel signal to be supplied to the column A/D conversion unit 104. Furthermore, the maintenance unit 132 may supply the signal value of the pixel signal, which is maintained, to the column A/D conversion unit 104, in a state where the supplying of the pixel signal to the column A/D conversion unit 104 is suspended due to the control by the control unit 131. Therefore, the signal processing unit 103 may suppress the fluctuation in the signal value during the A/D conversion period, and may suppress the occurrence of the spurious signal.

Moreover, the configuration of the control unit 131 is arbitrary. For example, the control unit 131, as illustrated in FIG. 7, may have a control signal supply unit 141 and a complementary switch 142.

In this case, during the A/D conversion period, the control signal supply unit 141 supplies the control signal, which disconnects (separates) the vertical signal line (VSL) and the input to the column A/D conversion unit 104, to the gate of each transistor of the complementary switch 142.

In the complementary switch 142, for example, the N-type transistor and the P-type transistor are connected in parallel between the vertical signal line (VSL) and the maintenance unit 132 (the column A/D conversion unit 104), and the gate control voltages, which are different in polarity, are applied to the gates of the transistors at the same time, respectively, to drive both of the transistors at the same time. That is, the complementary switch 142 is driven according to the control signal supplied from the control signal supply unit 141, and disconnects (separates) the vertical signal line (VSL) and the input to the column A/D conversion unit 104.

With this configuration, the control of the supplying of the pixel signal to the column A/D conversion unit 104 may be more easily realized. Moreover, instead of the complementary switch 142, the switch made from a single transistor may be used, but the complementary switch 142 may transfer all the electric potentials from the input side to the output side more surely than the switch made from the single transistor.

Furthermore, the configuration of the maintenance unit 132 also is arbitrary. For example, the maintenance unit 132, as illustrated in FIG. 7, may have a capacitor 151. The capacitor 151 is provided between the output from the control unit 131 (the complementary switch 142), that is, the input to the column A/D conversion unit 104, and a reference electric potential VSS, and maintains the signal value of the pixel signal supplied from the control unit 131, or supplies the signal value, which is maintained, to the column A/D conversion unit 104. With this configuration, the maintaining and the supplying of the pixel signal may be more easily realized.

The column A/D conversion unit 104 A/D-converts the pixel output fluctuation (the pixel signal) that is transferred through the source follower unit 102 and the signal processing unit 103, and outputs the result as the digital data (the image data).

Moreover, the column A/D conversion unit 104 may perform the A/D conversion both before the electric charge is read from the pixel (during the pre-charge phase) and after the electric charge is read from the pixel (during the data phase), and may perform the correlated double sampling (CDS) operation that takes the difference between results of both of the A/D conversions. Thus, for example, the noise component such as the kTC noise may be suppressed. Thus, the image quality of the image that corresponds to the image data may be improved.

Moreover, the configuration of the column A/D conversion unit 104 is arbitrary. For example, the column A/D conversion unit 104, as illustrated in FIG. 7, may have a comparator 161.

The comparator 161 compares the reference electric potential (Vref) with the pixel signal (Vin) that is input, and outputs the result of the comparison (the two items of value data) as the digital data. With this configuration, the column A/D conversion unit 104 may perform the A/D conversion more easily.

Figure 8:
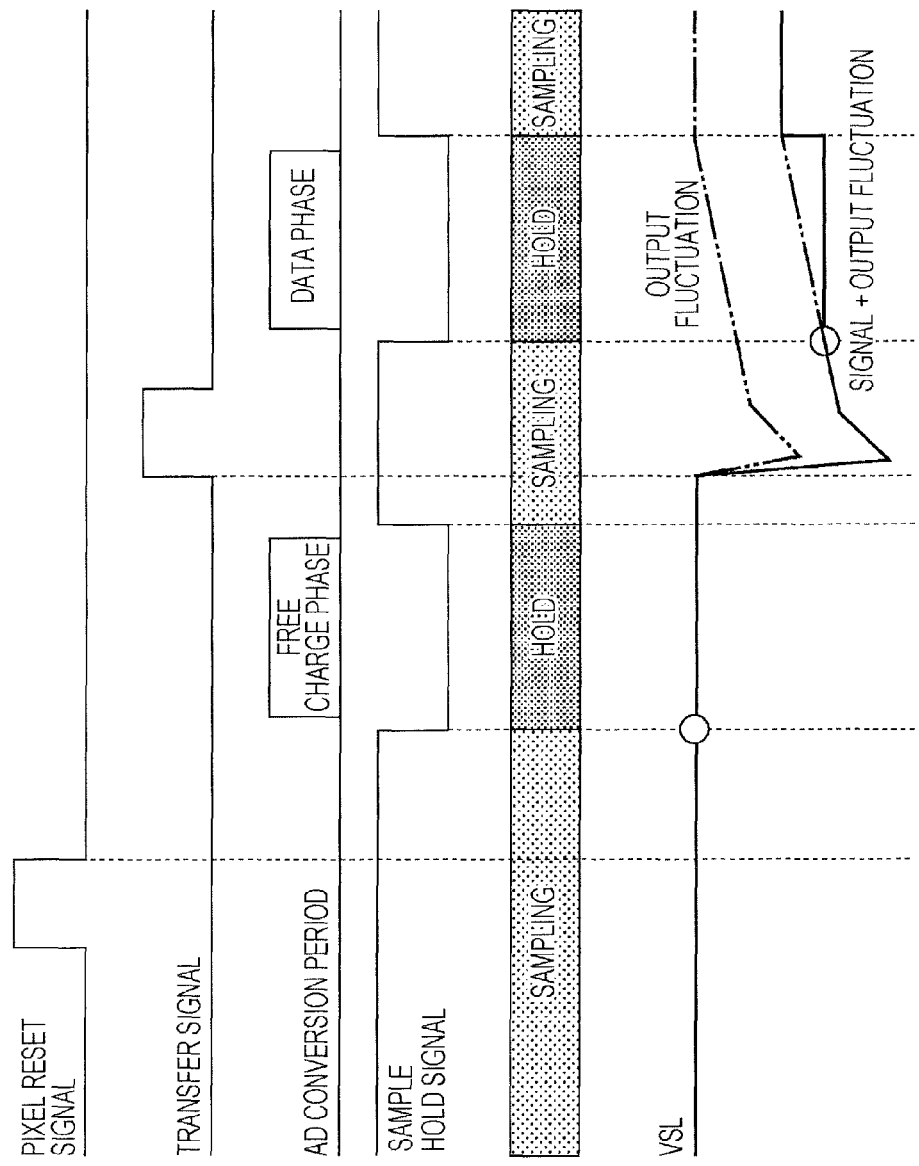
FIG. 8 is a timing chart illustrating an example of signals in the imaging device.

FIG. 8 is a timing chart illustrating an example of signals in the imaging device 100. A description is provided below using the configuration example in FIG. 7. The control signal supplied by the control signal supply unit 141 is assumed to dictate switching-on (sampling) with Hi, and to dictate switching-off (hold) with Lo.

The initial state of the complementary switch 142 is a sampling state, that is, a state in which a connection is made between the vertical signal line (VSL) and the input (Vin) to the comparator 161.

When a pulse of a pixel reset signal is supplied, the reset transistor (RST) 113 performs the reset operation of sweeping off the electrons from the floating diffusion (FD). The complementary switch 142 maintains the sampling state from when the reset operation is performed to immediately before the A/D conversion during the pre-charge phase starts, according to the control signal supplied from the control signal supply unit 141. Therefore, the capacitor 151 samples a pre-charge signal in the interval.

The control signal supply unit 141 controls the complementary switch 142 and thus a transition to a hold state, that is, to a state where the disconnection (the separation) is made between the vertical signal line (VSL) and the input (Vin) to the comparator 161, is made immediately before the A/D conversion during the pre-charge phase starts. The control signal supply unit 141 controls the complementary switch 142 and thus the hold state is maintained during the A/D conversion period. That is, the column A/D conversion unit 104 performs the A/D conversion in the hold state as it is. During the hold state, the signal value maintained in the capacitor 151 is supplied to the input (Vin) to the column A/D conversion unit 104.

When the A/D conversion period ends, the control signal supply unit 141 controls the complementary switch 142 and thus the transition to the sampling state is made.

When the transfer signal pulse is supplied, the transfer gate (TG) 112 reads the electric charge accumulated in the photo diode (PD) 111 and supplies the result to the floating diffusion (FD). The electric potential fluctuation in the floating diffusion (FD) is amplified by the amplification transistor (AMP) 121, and the result is read as the pixel signal. When the selection transistor (SEL) 122 is in an ON state, the pixel signal (the data signal) is supplied to the complementary switch 142 through the vertical signal line (VSL).

The complementary switch 142 maintains the sampling state until immediately before the A/D conversion during the data phase starts, according to the control signal supplied from the control signal supply unit 141. Therefore, the capacitor 151 samples the pixel signal (the data signal) in the interval.

The control signal supply unit 141 controls the complementary switch 142 and thus a transition to the hold state is made immediately before the A/D conversion during the data phase starts. The control signal supply unit 141 controls the complementary switch 142 and thus the hold state is maintained during the A/D conversion period. That is, the column A/D conversion unit 104 performs the A/D conversion during the hold state, as it is. During the hold state, the signal value maintained in the capacitor 151 is supplied to the input (Vin) to the column A/D conversion unit 104.

When the A/D conversion period ends, the control signal supply unit 141 controls the complementary switch 142, and thus the transition to the sampling state is made and the reading of the next signal is prepared for.

As described above, the sample and hold states of the complementary switch 142 are controlled by the control signal of the control signal supply unit 141. Therefore, the signal processing unit 103 may suppress the occurrence of the spurious signal due to the fluctuation in the signal value and may improve the image quality of the image that corresponds to the image data.

Moreover, the sample and hold control of the complementary switch 142 are not limited to the example described above. For example, during one part of the data phase of the A/D conversion period, the control signal supply unit 141 causes the complementary switch 142 to be in the hold state.

Furthermore, for example, the control signal supply unit 141 may cause the complementary switch 142 to be in the hold state from the starting point in time of the data phase of the A/D conversion period. Furthermore, for example, the control signal supply unit 141 may cause the complementary switch 142 to be in the hold state from a point in time that is earlier than the starting point in time of the data phase of the A/D conversion period.

Of course, for example, the control signal supply unit 141 may cause the complementary switch 142 to be in the hold state, during a period that includes the entire data phase of the A/D conversion period and is longer than the data phase of the A/D conversion period.

For example, the control signal supply unit 141 may cause the complementary switch 142 to be in the hold state from the starting point in time of the data phase of the A/D conversion period to an ending point in time. Furthermore, for example, the control signal supply unit 141 may cause the complementary switch 142 to be in the hold state from the starting point in time of the data phase of the A/D conversion period to a point in time that is later than the ending point in time.

Moreover, for example, the control signal supply unit 141 may cause the complementary switch 142 to be in the hold state from a point in time that is earlier than the starting point in time of the data phase of the A/D conversion period to the ending point in time. Furthermore, for example, the control signal supply unit 141 may cause the complementary switch 142 to be in the hold state from the point in time that is earlier than the starting point in time of the data phase of the A/D conversion period to the point in time that is later than the ending point in time.

By doing this, the signal processing unit 103 may suppress the occurrence of the spurious signal during the data phase of the A/D conversion period, and may improve more the image quality of the image that corresponds to the image data.

Moreover, the control signal supply unit 141 may perform the same control as during the pre-charge phase. That is, the signal processing unit 103 may suppress the occurrence of the spurious signal also during the pre-charge phase of the A/D conversion period, and may improve more the image quality of the image that corresponds to the image data.

Figure 9:
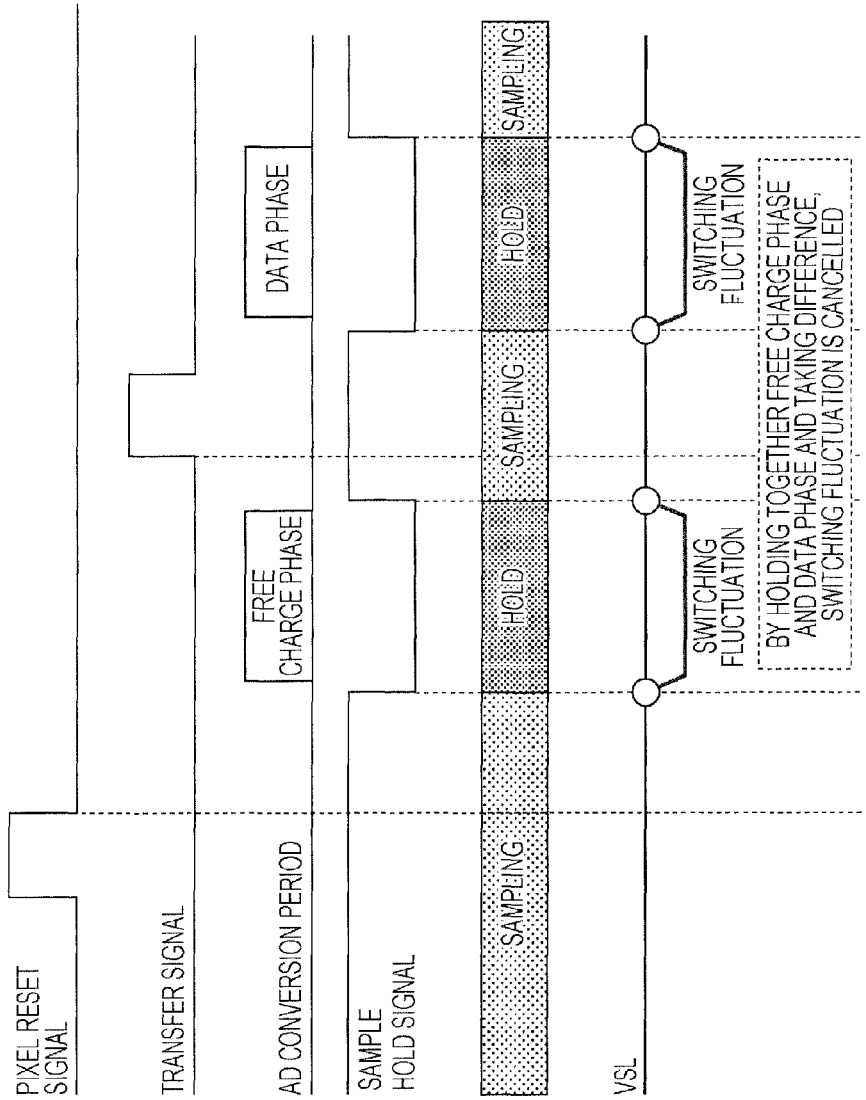
FIG. 9 is a timing chart illustrating an example of signals in FIG. 8 in the imaging device.

FIG. 9 is a timing chart illustrating an example of the signals in the imaging device 100. The fluctuation in the sampling node due to the charge injection and the clock feedthrough occurs at the time of the switching. However, the signal processing unit 103 performs the sampling two times before each of the pre-charge phase and the data phase, as described above, in accordance with the CDS operation by the column A/D conversion unit 104. Therefore, the column A/D conversion unit 104 may cancel the fluctuation by performing the CDS operation and thus taking the difference between the results of the A/D conversion that are performed during the pre-charge phase and during the data phase.

As described above, during the A/D conversion period, the signal processing unit 103 may suppress the occurrence of the spurious signal due to the output fluctuation in the vertical signal line (VSL) by separating the input (Vin) to the column A/D conversion unit 104 from the vertical signal line (VSL). That is, resistance of the column A/D conversion unit 104 to disturbance noise from the vertical signal line (VSL) may be increased.

Furthermore, the fluctuation in the sampling node due to the switching by the complementary switch 142 may be suppressed by performing the sampling with respect to each of the pre-charge phase and the data phase in the CDS operation by the column A/D conversion unit 104 and thus taking the difference between the sampling results.

As described above, the imaging device 100 to which the present technology is applied may be configured from the imaging element. The imaging element may be whatever kind, and for example, may be a CMOS image sensor and a charge coupled device (CCD) image sensor.

1-4. Flow of Sample and Hold Processing

Figure 10:
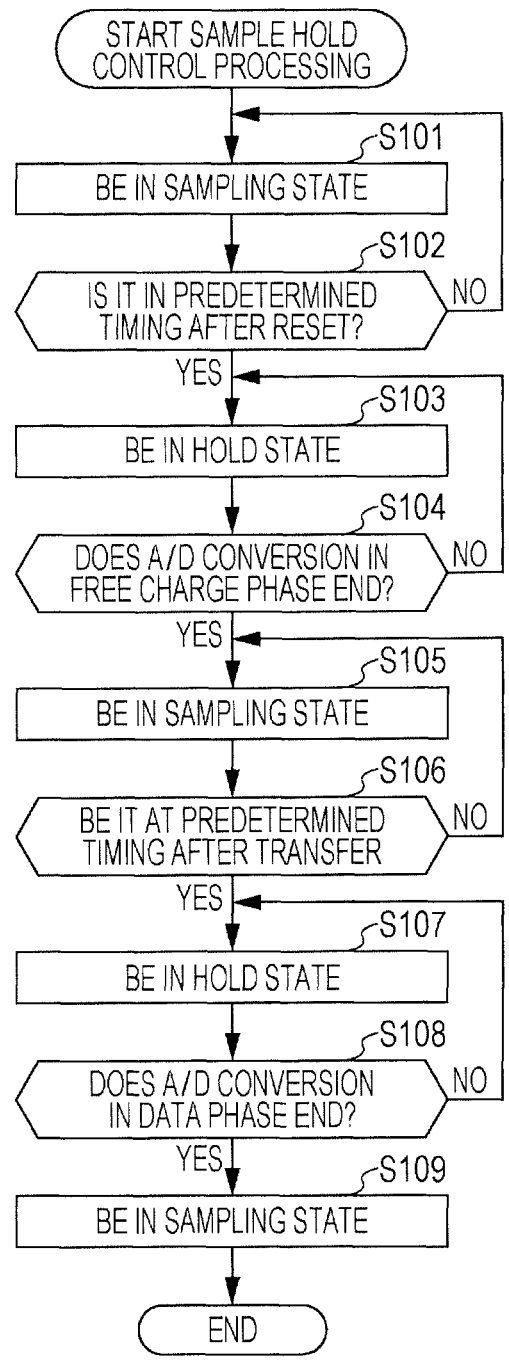
FIG. 10 is a flowchart for describing an example of a flow of sample and hold control processing.

An example of a flow of the sample and hold control processing performed by the imaging device 100 is described referring to a flowchart in FIG. 10.

When the sample and hold control processing starts, the control signal supply unit 141 causes the complementary switch 142 to be in the sampling state in Step S101.

In Step S102, the control signal supply unit 141 determines whether or not a predetermined timing has come, after resetting the floating diffusion (FD). When it is determined that the predetermined timing has not come, the processing returns to Step S101. That is, the sampling state is maintained until the predetermined timing comes.

In Step S102, when it is determined that the predetermined timing has come, the processing proceeds to Step S103.

In Step S103, the control signal supply unit 141 causes the complementary switch 142 to be in the hold state.

In Step S104, the control signal supply unit 141 determines whether or not the A/D conversion during the pre-charge phase has ended. When it is determined that the A/D conversion during the pre-charge phase has not ended, the processing returns to Step S103. That is, the hold state is maintained until the A/D conversion during the pre-charge phase ends.

In Step S104, when it is determined that the A/D conversion during the pre-charge phase has ended, the processing proceeds to Step S105.

In Step S105, the control signal supply unit 141 causes the complementary switch 142 to be in the sampling state.

In Step S106, the control signal supply unit 141 determines whether or not a predetermined timing has come, after transferring the electric charge of the pixel. When it is determined that the predetermined timing has not come, the processing returns to Step S105. That is, the sampling state is maintained until the predetermined timing comes.

In Step S106, when it is determined that the predetermined timing has come, the processing proceeds to Step S107.

In Step S107, the control signal supply unit 141 causes the complementary switch 142 to be in the hold state.

In Step S108, the control signal supply unit 141 determines whether or not the A/D conversion during the data phase has ended. When it is determined that the A/D conversion during the data phase has not ended, the processing returns to Step S107. That is, the hold state is maintained until the A/D conversion during the data phase ends.

In Step S108, when it is determined that the A/D conversion during the data phase has ended, the processing proceeds to Step S109.

In Step S109, the control signal supply unit 141 causes the complementary switch 142 to be in the sampling state.

When the processing in Step S109 ends, the sample and hold control processing ends. The control signal supply unit 141 performs the sample and hold control processing, as described above, for every pixel.

The signal processing unit 103 may suppress the occurrence of the spurious signal due to the fluctuation in the signal value and may improve the image quality of the image that corresponds to the image data, by controlling the state of the complementary switch 142 in this manner.

2. Second Embodiment

Imaging Device

Figure 11:
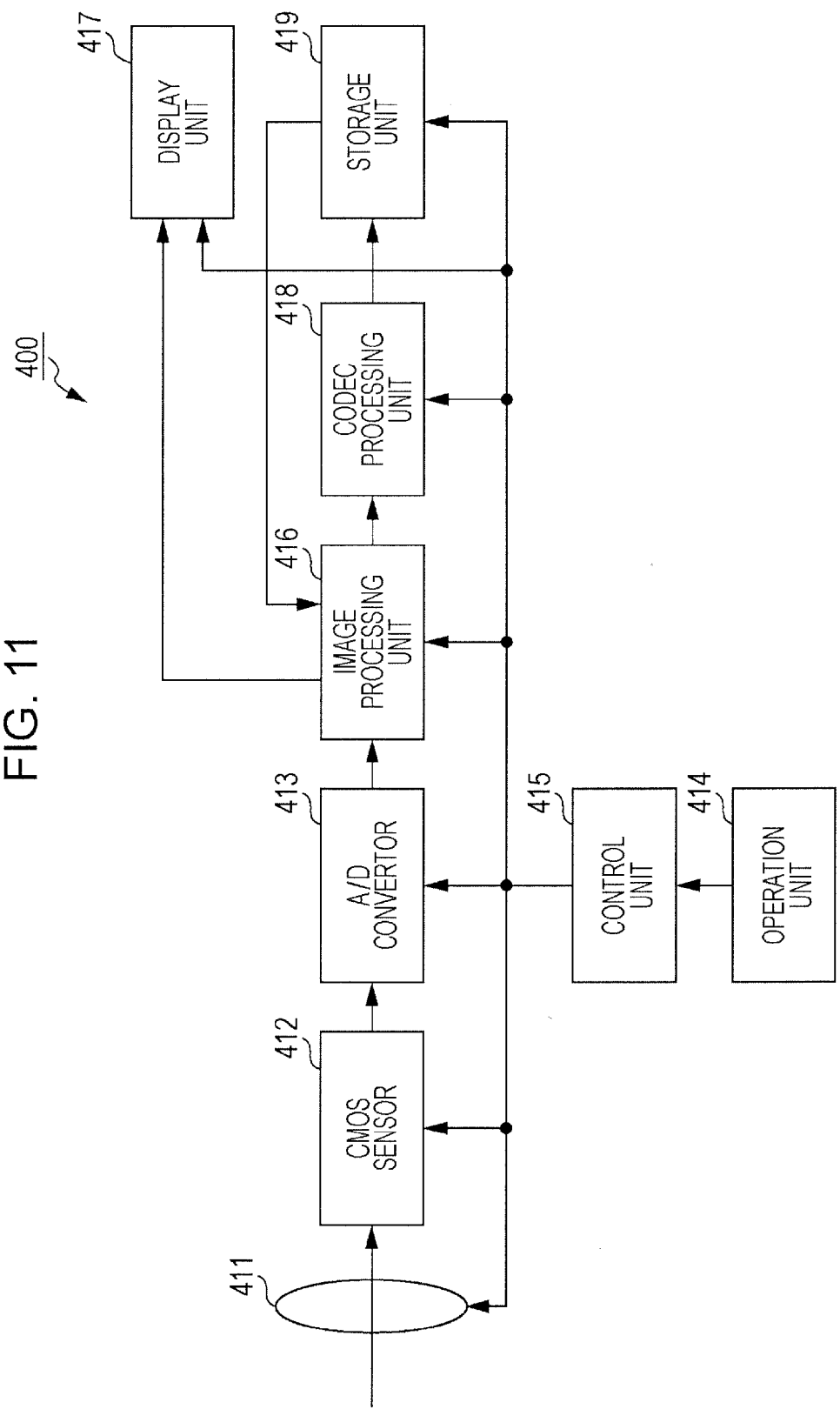
FIG. 11 is a view illustrating an example of a main configuration of one part of the imaging device.

FIG. 11 is a block diagram illustrating an example of a main configuration of an imaging device that uses the signal processing device described above. An imaging device 400 illustrated in FIG. 11 is a device that images a photographic object and outputs an image of the photographic object as an electric signal.

As illustrated in FIG. 11, the imaging device 400 has an optical unit 411, a CMOS sensor 412, an A/D conversion unit 413, an operation unit 414, a control unit 415, an image processing unit 416, a display unit 417, a codec processing unit 418, and a record unit 419.

The optical unit 411 is made from a lens that adjusts a focal point depending on a distance to a photographic object and collects light from a position in focus, a diaphragm that adjust exposure, a shutter that controls a timing of capturing an image and more. The light (incident light) from the photographic object passes through the optical unit 411 and is supplied to the CMOS sensor 412.

The CMOS sensor 412 photoelectric-converts the incident light and supplies a signal (a pixel signal) from every pixel to the A/D conversion unit 413.

The A/D conversion unit 413 converts the pixel signal, supplied at a predetermined timing from the CMOS sensor 412, to digital data (image data) and supplies the result to the image processing unit 416, sequentially at the predetermined timing.

The operation unit 414 is configured, for example, from a jog dial (a trademark), a key, a button, a touch panel, or the like, receives an operational input from a user, and supplies a signal corresponding to the operational input to the control unit 415.

The control unit 415 controls driving of the optical unit 411, the CMOS sensor 412, the A/D conversion unit 413, the image processing unit 416, the display unit 417, the codec processing unit 418 and the record unit 419, and causes each component to perform the processing relating to the photographing, based on the signal corresponding to the operational input that is input by the user through the operation unit 414.

The image processing unit 416 performs various image processing, such as mixed color correction, black level correction, white balance adjustment, de-mosaic processing, matrix processing, gamma correction, and YC conversion, on the image data supplied from the A/D conversion unit 413. The image processing unit 416 supplies the image data, on which the image processing is performed, to the display unit 417 and the codec processing unit 418.

The display unit 417 is configured, for example, from a liquid crystal display or the like, and displays the photographic object image, based on the image data supplied from the image processing unit 416.

The codec processing unit 418 performs encoding in a predetermined scheme on the image data supplied from the image processing unit 416 and supplies the obtained encoded data to the record unit 419.

The record unit 419 records the encoded data from the codec processing unit 418. The encoded data recorded in the record unit 419 is read from the image processing unit 416 and is decoded, whenever necessary. The image data obtained by the decoding is supplied to the display unit 417, and the corresponding image is displayed.

The present technology described above is applied to the CMOS sensor 412 of the imaging device 400 as described above. That is, the signal processing unit 103 as described above is used in the CMOS sensor 412. However, the column A/D conversion unit 104 in FIG. 7 is determined as included in the A/D conversion unit 413. Therefore, the CMOS sensor 412 may suppress the occurrence of the spurious signal in the A/D conversion unit 413. Therefore, the imaging device 400 may obtain the image that is higher in image quality, by capturing an image of the photographic object.

Moreover, the imaging device to which the present technology is applied is not limited to the configuration described above, and other configurations may be possible. For example, instead of the CMOS sensor 412, the CCD image sensor to which the present technology is applied may be used. Furthermore, for example, the imaging device to which the present technology is applied may be an information processing device with an imaging function, such as a digital still camera, a video camera, a portable telephone, a smart phone, a tablet type device, and a personal computer. Furthermore, the imaging device to which the present technology is applied may be a camera module that is installed (or is installed as a built-in device) in other information processing devices.

3. Third Embodiment

Computer

A sequence of processing described above may be executed in hardware and may be executed in software. In a case where the sequence of processing is executed in software, a program making up the software is installed on a computer. The computer here includes a computer that is built into dedicated hardware and a general-purpose personal computer that is able to execute various functions by installing various programs.

FIG. 12 is a block diagram illustrating an example of a hardware configuration of the computer that executes the sequences of processing described above using the program.

In a computer 500 illustrated in FIG. 12, a central processing unit (CPU) 501, a read only memory (ROM) 502, and a random access memory (RAM) 503 connect to each other through a bus 504.

Furthermore, an input-output interface 510 also connects to the bus 504. An input unit 511, an output unit 512, a storage unit 513, a communication unit 514, and a drive 515 connect to the input/output interface 510.

The input unit 511 is made, for example, from a keyboard, a mouse, a microphone, a touch panel, an input terminal, or the like. The output unit 512 is made, for example, from a display, a speaker, an output terminal, or the like. The storage unit 513 is made, for example, from a hard disk, a RAM disk, a nonvolatile memory, or the like. The communication unit 514 is made, for example, from a network interface or the like. The drive 515 drives a removable medium 521, such as a magnetic disk, an optical disk, a magneto-optical disc, or a semiconductor memory.

In the computer with the configuration described above, the CPU 501 performs the sequence of processing described above, for example, by loading the program stored in the storage unit 513 onto the RAM 503 through the input-output interface 510 and the bus 504 in order to execute it. For example, data necessary for the CPU 501 to perform the various processing is further appropriately stored in the RAM 503.

The program executed by the computer (CPU 501) may be recorded, for example, on the removable medium 521 such as a package medium and may be applied. Furthermore, the program may be provided through a cable or wireless transmission medium such as a local area network, the Internet, and digital satellite broadcasting.

In the computer, the program may be installed in the storage unit 513 through the input/output interface 510 by mounting the removable medium 521 onto the drive 515. Furthermore, the program may be received with the communication unit 514 through the cable or wireless transmission medium and be installed on the storage unit 513. In addition, the program may be installed beforehand on the ROM 502 or the storage unit 513.

Moreover, the program executed by the computer may be a program by which the processing is performed in time series in the order described in the present specification, or may be a program by which the processing is performed in parallel at a necessary timing, such as when the calling is performed.

Furthermore, in the present specification, the step of describing the program stored on a recordable medium includes not only processing that is performed in time series in the described order, but also processing that is performed in parallel or individually even though the processing is not necessarily performed in time series.

Furthermore, in the present specification, a system means an assembly of multiple constituent elements (a device, a module and others), regardless of whether or not they are all in the same housing. Therefore, multiple devices that are individually contained in the different housings and are connected to each other over a network is the system, and one device in which multiple modules are contained in one housing is the system as well.

Furthermore, in the above description, the configuration described as one device (or a processing unit) may be divided, and a configuration made from the multiple devices (or the multiple processing units) may be possible. Conversely, in the above description, the configuration described as multiple devices (or multiple processing units) may be arranged into a configuration made from one device (or one processing unit). Furthermore, a configuration other than the configurations described above may be added to a configuration of each device (or each processing unit). Moreover, when the configurations and operations are substantially the same as the whole system, one part of a configuration of a certain device (or a certain processing unit) may be included in a configuration of another device (or another processing unit).

The suitable embodiments according to the present technology are described in detail above referring to the accompanying drawings, but a technological scope of the present technology is not limited to this example. The devising of examples of various changes or amendments within a scope of technological ideas described in a scope of each claim are obvious to a person of ordinary skill in the art relating to the present technology, and thus these are justifiably interpreted as falling into the technological scope of the present technology.

For example, according to the present technology, cloud computing in which one function is shared and jointly processed over a network by the multiple devices may be employed as a configuration.

Furthermore, each step described with the flowchart described above may be shared and jointly performed by the multiple devices, in addition to being performed with one device.

Furthermore, in a case where multiple processing operations are included in one step, the multiple processing operations included in the one step may be shared and jointly performed by the multiple devices, in addition to being performed with one device.

Moreover, the present technology may employ the following configurations.

(1) A signal processing device including a control unit that suspends supplying of a signal to an A/D conversion unit which performs A/D conversion, during an A/D conversion period in which the A/D conversion is performed on the signal that depends on electric charge read from a pixel and a maintenance unit that maintains a signal value of the signal in a state where the signal is supplied by the control unit to the A/D conversion unit and that supplies the maintained signal value to the A/D conversion unit in a state where the supplying of the signal to the A/D conversion unit is suspended by the control unit.

(2) The signal processing device according to (1), in which the A/D conversion unit has two A/D conversion periods, a pre-charge period in which a noise of the pixel is A/D-converted, and a data period in which the signal including data on the pixel is A/D-converted, and performs a correlated double sampling (CDS) operation of taking a difference between a result of the A/D conversion during the pre-charge period and a result of the A/D conversion during the data period.

(3) The signal processing device according to (2), in which the control unit suspends the supplying of the signal to the A/D conversion unit during the data period of the A/D conversion period.

(4) The signal processing device according to (3), in which the control unit suspends the supplying of the signal at least during the entire data period.

(5) The signal processing device according to (4), in which the control unit suspends the supplying of the signal during a period that includes the entire data period and is longer than the data period.

(6) The signal processing device according to any one of (3) to (5), in which the control unit additionally suspends the supplying of the signal during the pre-charge period of the A/D conversion period.

(7) The signal processing device according to (6), in which the control unit suspends the supplying of the signal during the entire pre-charge period.

(8) The signal processing device according to (7), in which the control unit suspends the supplying of the signal during a period that includes the entire pre-charge period and is longer than the pre-charge period.

(9) The signal processing device according to any one of (1) to (8), in which the control unit includes a switch that controls a connection between a signal line over which to transfer the signal, and an input to the A/D conversion unit, and a control signal supply unit that supplies a control signal controlling the switch, in which the control signal supply unit supplies the control signal, disconnecting the signal line and the input to the A/D conversion unit, to the switch during the A/D conversion period.

(10) The signal processing device according to (9), in which the switch is made from a complementary switch.

(11) The signal processing device according to any one of (1) to (10), in which the maintenance unit includes a capacitor that is formed between an input to the A/D conversion unit and a reference electric charge, and maintains the signal value.

(12) The signal processing device according to (1) further including an A/D conversion unit.

(13) The signal processing device according to (12), in which the A/D conversion unit A/D-converts the signal that depends on the electric charge of the each pixel in a predetermined line in a pixel array.

(14) The signal processing device according to any one of (1) to (13), further including a source follower unit that generates and transfers the signal which depends on the electric charge read from the pixel, in which the control unit suspends the supplying of the signal, output from the source follower unit, to the A/D conversion unit during the A/D conversion period.

(15) The signal processing device according to (14), further including a photodiode that accumulates the electric charge in the pixel, and a floating diffusion unit that maintains the electric charge read from the photodiode, in which the source follower unit generates and transfers the signal that depends on the electric charge maintained in the floating diffusion unit.

(16) A signal processing method for use in a signal processing device, including causing the signal processing unit to suspend supplying of a signal to an A/D conversion unit which performs A/D conversion, during an A/D conversion period in which the A/D conversion is performed on the signal that depends on an electric charge read from a pixel, and causing the signal processing unit to maintain a signal value of the signal in a state where the signal is supplied to the A/D conversion unit and to supply the maintained signal value to the A/D conversion unit in a state where the supplying of the signal to the A/D conversion unit is suspended.

(17) An imaging device including an imaging unit that images a photographic object, and an image processing unit that image-processes image data obtained through the imaging by the imaging unit, in which the imaging unit includes an A/D conversion unit that A/D-converts a signal depending on an electric charge read from a pixel and generates the image data, a control unit that suspends supplying of the signal to the A/D conversion unit during an A/D conversion period in which A/D conversion is performed on the signal, and a maintenance unit that maintains a signal value of the signal in a state where the signal is supplied by the control unit to the A/D conversion unit and that supplies the maintained signal value to the A/D conversion unit in a state where the supplying of the signal to the A/D conversion unit is suspended by the control unit.

(18) The imaging device according to (17), in which the A/D conversion unit has two A/D conversion periods, a pre-charge period in which a noise of the pixel is A/D-converted, and a data period in which the signal including data on the pixel is A/D-converted, and performs a correlated double sampling (CDS) operation of taking a difference between a result of the A/D conversion during the pre-charge period and a result of the A/D conversion during the data period.

(19) A solid state imaging element including a control unit that suspends supplying of a signal to an A/D conversion unit which performs A/D conversion, during an A/D conversion period in which the A/D conversion is performed on the signal that depends on an electric charge read from a pixel, and a maintenance unit that maintains a signal value of the signal in a state where the signal is supplied by the control unit to the A/D conversion unit and that supplies the maintained signal value to the A/D conversion unit in a state where the supplying of the signal to the A/D conversion unit is suspended by the control unit.

(20) The solid state imaging device according to (19), in which the A/D conversion unit has two A/D conversion periods, a pre-charge period in which a noise of the pixel is A/D-converted, and a data period in which the signal including data on the pixel is A/D-converted, and performs a correlated double sampling (CDS) operation of taking a difference between a result of the A/D conversion during the pre-charge period and a result of the A/D conversion during the data period.

The present disclosure contains subject matter related to that disclosed in Japanese Priority Patent Application JP 2012-103132 filed in the Japan Patent Office on Apr. 27, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging device comprising:
a pixel configured to convert an incident light into a pixel signal;
a signal line connected to the pixel to convey the pixel signal;
an A/D converter configured to perform an analog to digital conversion, the A/D converter including a comparator;
a switch circuitry disposed between the signal line and the comparator, the switch circuitry being configured to control a connection between the signal line and an input terminal of the comparator;
maintenance circuitry disposed between the comparator and the switch circuit, the maintenance circuitry being configured to hold the pixel signal conveyed by the switch circuit; and
a control unit configured to supply a control signal for controlling the switch circuit,
wherein the maintenance circuitry includes a capacitor, the capacitor being coupled between a predetermined potential and the switch circuitry, wherein the switch circuitry includes a P-type transistor and an N-type transistor that is coupled in parallel with the P-type transistor, and a gate of the P-type transistor is coupled to the N-type transistor through an inverter.

2. The imaging device according to claim 1, wherein the comparator compares the pixel signal and a reference signal.

3. An electronic apparatus comprising
an imaging device; and
an image processing unit that processes images from the imaging device,
wherein the imaging device comprises:
a pixel configured to convert an incident light into a pixel signal;
a signal line connected to the pixel to convey the pixel signal;
an A/D converter configured to perform an analog to digital conversion, the A/D converter including a comparator;
a switch circuitry disposed between the signal line and the comparator, the switch circuitry being configured to control a connection between the signal line and an input terminal of the comparator;
maintenance circuitry disposed between the comparator and the switch circuit, the maintenance circuitry being configured to hold the pixel signal conveyed by the switch circuit; and
a control unit configured to supply a control signal for controlling the switch circuit,
wherein the maintenance circuitry includes a capacitor, the capacitor being coupled between a predetermined potential and the switch circuitry, wherein the switch circuitry includes a P-type transistor and an N-type transistor that is coupled in parallel with the P-type transistor, and a gate of the P-type transistor is coupled to the N-type transistor through an inverter.

4. The electronic apparatus according to claim 3, wherein the comparator compares the pixel signal and a reference signal.

5. An imaging device comprising:
a pixel configured to convert an incident light into a pixel signal;
a signal line connected to the pixel to convey the pixel signal;
an A/D converter configured to perform an analog to digital conversion, the A/D converter including a comparator;
a switch circuitry disposed between the signal line and the comparator, the switch circuitry being configured to control a connection between the signal line and an input terminal of the comparator;
maintenance circuitry disposed between the A/D converter and the switch circuit, the maintenance circuitry being configured to hold the pixel signal conveyed by the switch circuit, wherein the maintenance circuitry includes a capacitor, the capacitor being coupled between a predetermined potential and the switch circuitry, wherein the switch circuitry includes a P-type transistor and an N-type transistor that is coupled in parallel with the P-type transistor, and a gate of the P-type transistor is coupled to the N-type transistor through an inverter; and
a control unit configured to supply a control signal for controlling the switch circuit,
wherein the A/D converter carries out a pre-charge period in which a noise of the pixel is A/D-converted, and a data period in which pixel data is A/D-converted, and performs a correlated double sampling (CDS) operation of taking a difference between a result of the A/D conversion during the pre-charge period and a result of the A/D conversion during the data period.

6. The imaging device according to claim 5, wherein the control unit suspends the supplying of the pixel signal to the A/D converter during the data period.

7. The imaging device according to claim 6, wherein the control unit suspends the supplying of the pixel signal for at least an entirety of the data period.

8. The imaging device according to claim 7, wherein the control unit suspends the supplying of the signal for an additional period longer than the entirety of the data period.

9. An electronic apparatus comprising an imaging device according to claim 5, and an image processing unit that processes images from the imaging device.

10. The electronic apparatus according to claim 9, wherein the control unit suspends the supplying of the pixel signal to the A/D converter during the data period.

11. The electronic apparatus according to claim 10, wherein the control unit suspends the supplying of the pixel signal for at least an entirety of the data period.

12. The electronic apparatus according to claim 11, wherein the control unit suspends the supplying of the signal for an additional period longer than the entirety of the data period.

* * * * *